United States Patent [19]

Regan

[11] 4,205,630
[45] Jun. 3, 1980

[54] STEAM AIR PREHEATER FOR MAINTAINING THE FLUE GAS TEMPERATURE ENTERING DUST COLLECTION EQUIPMENT

[75] Inventor: John W. Regan, Windsor, Conn.

[73] Assignee: Combustion Engineering, Inc., Windsor, Conn.

[21] Appl. No.: 960,985

[22] Filed: Nov. 15, 1978

[51] Int. Cl.² ........................................... F22B 33/00
[52] U.S. Cl. .............................. 122/1 R; 122/DIG. 1; 122/DIG. 2; 110/304
[58] Field of Search .......... 122/1 R, DIG. 1, DIG. 2, 122/1 A; 98/45, 46; 110/304

[56] References Cited

U.S. PATENT DOCUMENTS

| | | | |
|---|---|---|---|
| 2,511,647 | 6/1950 | Marshall | 110/304 |
| 3,126,945 | 3/1964 | Kuhner | 110/304 |
| 3,148,665 | 9/1964 | Switzer, Jr. | 122/1 R |
| 3,765,377 | 10/1973 | Freiday | 122/DIG. 2 |
| 3,835,650 | 9/1974 | Chesnejef | 60/670 |
| 3,938,934 | 2/1976 | Frondorf | 122/DIG. 2 |
| 4,149,453 | 4/1979 | Reed | 98/46 |

Primary Examiner—Henry C. Yuen
Attorney, Agent, or Firm—William W. Habelt

[57] ABSTRACT

In a pulverized fuel-fired steam generator, a steam air heater is disposed in the air inlet duct to the main air heater. Steam from an auxiliary in-plant source or from the boiler itself is passed through the steam air heater thereby increasing the temperature of the air entering the main air heater. The flow rate of steam passed through the steam air heater is regulated to maintain the flue gas temperature entering dust collection equipment located in the flue gas stream downstream of the main air heater above the dew point of water vapor and the condensation point of sulfuric acid during start-up and low load operations.

5 Claims, 1 Drawing Figure

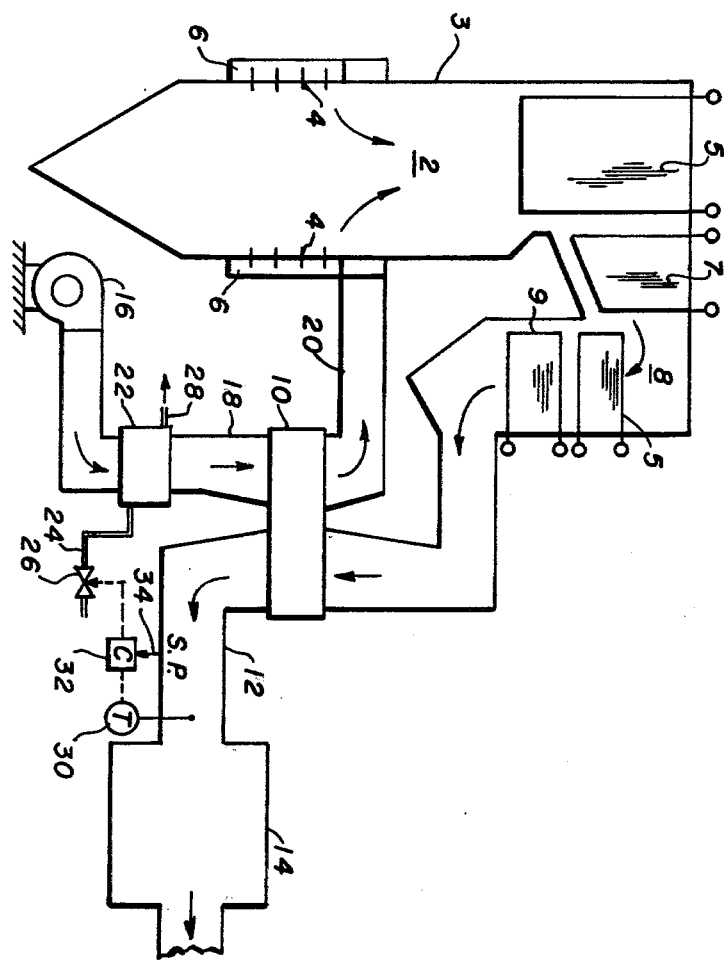

STEAM AIR PREHEATER FOR MAINTAINING THE FLUE GAS TEMPERATURE ENTERING DUST COLLECTION EQUIPMENT

BACKGROUND OF THE INVENTION

This invention relates to a pulverized fuel-fired steam generator equipped with a dust collection device and more particularly to a steam air heater for maintaining the flue gas temperature entering said dust collection device above a preselected minimum.

Dust collection equipment is being installed on all pulverized fuel-fired steam generators to remove fly ash and other particulates from the flue gas formed during the combustion process. One common form of dust collection equipment utilized on pulverized fuel-fired steam generators is the cold end electrostatic percipitator, i.e. an electrostatic precipitator located in the flue gas stream immediately downstream of the air heater. One limitation of the cold end electrostatic precipitator is that it cannot be brought into operation until the flue gas temperature entering is above the dew point of water vapor in the flue gas stream as fly ash in the flue gas will have a relatively low resistivity if the moisture in the flue gas condenses. For most pulverized fuel-fired applications, this minimum flue gas temperature required at the electrostatic precipitator is 200° F. Another problem associated with cold end electrostatic precipitators is a loss in efficiency due to the presence of condensed sulfuric acid mist in a flue gas. Even a few ppm's of condensed sulfuric acid in the flue gas passing through the electrostatic precipitator can result in halving of its collection efficiency. Further, optimum electrostatic precipitator performance is obtained with a flue gas temperature of 275° to 325° F., the range of maximum fly ash resistivity. For these reasons, operation of the electrostatic precipitator is precluded during start-up and low load operation and a more expensive fossil fuel such as oil or natural gas must be fired during start-up in order to meet stack opacity requirements and particulate emission requirements, with pulverized fuel not being fired until the required minimum flue gas temperature is reached.

Another highly efficient form of dust collection equipment is the fabric filter. However, the application of fabric filters to pulverized fuel-fired steam generators has been somewhat limited because of considerations relating to flue gas temperature. If the flue gas temperature entering the fabric filter drops below the dew point of water vapor, the fly ash collected on the bag filter is moist and tends to adhere to the filter bags causing an adverse increase in pressure drop. Also, if the flue gas temperature entering drops below the condensation point of sulfuric acid, the flue gas becomes corrosive to all but prohibitively expensive bag fabrics and bag life is greatly reduced. For these reasons, use of fabric filters on pulverized fuel-fired steam generators is precluded during start-up and low load operation unless a more expensive fossil fuel such as natural gas is fired.

Recent technological innovations with respect to igniting pulverized coal now make it possible to light-off and stabilize a steam generator on coal exclusively. Coal-fired warm-up nozzles replace the standard oil- or gas-fired warm-up guns and ignition energy is supplied by a high energy electric arc from a spark plug type ignitor integral to the coal-fired warm-up nozzle. Thus, it is theoretically possible to eliminate the use of the more expensive and less available fossil fuels such as oil and natural gas during start-up and low load operation on coal-fired boilers. However, a practical consideration limiting the utilization this technology is the unavailability of dust collection equipment during start-up and low load operation for the reasons discussed previously. Due to the ash content of coal, particulate formation during coal-fired start-up and low load operation would preclude the use of coal because of environmentally unacceptable levels of particulate emission and stack opacity unless dust collection equipment is on-line.

In the invention disclosed herein, a steam air heater is disposed in the combustion air intake duct between the forced draft fan and the main flue gas heated air preheater for raising the temperature of the combustion air entering the main air preheater. It is known in the prior art to utilize a steam air heater so disposed to raise the temperature of the combustion air entering the main air preheater on pulverized fuel steam generators during low load operation in order to limit the corrosion of the cold end heat transfer surfaces on the main air preheater. However, the incoming combustion air is heated only to such a temperature as necessary to insure that the average metal temperature in the cold end section of the main air preheater remains above a specified minimum temperature, said minimum temperature being a function of the flue gas composition and the material used in the construction of the main air preheater. The amount of steam passed through the steam air heater is regulated so as to maintain the average cold end temperature above the specified minimum metal temperature. The average cold end temperature is defined as one half the sum of the air temperature entering and the flue gas temperature leaving the main air preheater and ranges from 155° to 185° F. for coal firing. In accordance with the invention disclosed herein, the flow rate of the steam passed through the steam air heater is regulated in response to the flue gas temperature entering the dust collection equipment and not, as in the prior art, in response to the average cold end temperature.

SUMMARY OF THE INVENTION

In accordance with the invention a steam air heater is disposed in the combustion air intake between the forced draft fan and the main flue gas heated air preheater for raising the temperature of the combustion air entering the main air preheater. In this manner, combustion air can be preheated to the required level while limiting the heat lost by the flue gas in the main air preheater so as to prevent the temperature of the flue gas entering the dust collection device from falling below the dew point of water vapor and the condensation point of sulfuric acid during start-up and low load operation.

Preferably, steam generated in the boiler sections of the steam generator is used to heat the incoming combustion air. Alternatively, steam from an auxiliary in-plant source may be used to heat the incoming combustion air. The amount of steam passed through the steam air heater is regulated so as to maintain the temperature of the flue gas entering the dust collection equipment above the dew point of water vapor and the condensation point of sulfuric acid.

The invention as recited above has several advantages. The steam coils of the steam air heater when disposed in the air intake duct as in the present invention, are not subject to fouling, corrosion, or erosion as would be steam coils disposed in the flue gas stream. Therefore, maintenance requirements are minimal and unit reliability is ensured. Further, although increasing the temperature of the air entering the main air preheater reduces the heat loss by the flue gas passing through the main air preheater as desired, the reduction is not linear with an increase in the temperature of the air entering the main air preheater. Therefore, there is an increase in the temperature of the air leaving the main air preheater associated with the increase in the temperature of the air entering the main air preheater even though the heat loss by the flue gas passing through the main air preheater has been reduced. Consequently, boiler efficiency is also increased.

BRIEF DESCRIPTION OF THE DRAWING

The FIGURE is a schematic illustration of a steam generator equipped with a dust collection device instructed in accordance with the preferred embodiment of the invention.

DESCRIPTION OF THE PREFERRED EMBODIMENT

The FIGURE illustrates a pulverized fuel-fired steam generator unit having a furnace 2 surrounded by four walls of steam generating tubes 3. Pulverized fuel enters through burners 4 and combustion air through wind box 6 with combustion taking place within the furnace 2. Hot combustion products, termed flue gas, formed in the furnace then pass through gas pass 8 thence through main air heater 10 passing out of the unit as cool flue gas through air preheater flue gas duct 12 to dust collector 14. Disposed in gas pass 8 of the steam generator are superheater 5, preheater 7, and economizer 9 referred to collectively with steam generating tubes 3 as a boiler.

Air to support combustion of the fuel supplied to the furnace 2 from the atmosphere by forced draft fan 16 passes through steam air heater 22 disposed in air intake duct 18 and through the main air preheater 10 and thence through duct 20 to wind box 6 from which it is delivered to the furnace 2 as combustion supporting air.

Steam from the boiler section of the steam generator or from an auxiliary in-plant source (not shown) passes through steam line 24 and control valve 26 to steam air heater 22. Having passed through steam air heater 22 and lost heat to the combustion air, the condensed steam passes through drain 28 to waste, or if desired, returned to the system. The flow rate of steam to steam air heater 22 is regulated to maintain the flue gas temperature entering dust collector 14 above a preselected temperature known to be above the dew point of water vapor and the condensation point of sulfuric acid mist. Temperature sensing device 30, positioned in the air preheater flue gas outlet duct 12 at the entrance to dust collector 14, sends a signal to controller 32 wherein this signal is compared to set point signal 34, which in this case would represent a preselected temperature known to be above the dew point of water vapor and the condensation point of sulfuric acid mist. A resultant signal indicating whether the sensed temperature is above or below the set point is emitted from controller 32 and passed to control valve 26 which opens to permit steam flow through steam line 24 to steam air heater 22 whenever the sensed temperature is lower than the set point temperature.

From the above, it can be seen that a simple and efficient apparatus and method has been provided for maintaining the flue gas temperature entering the dust collector on a pulverized fuel-fired steam generator above that necessary to permit the operation of a dust collector at low load and during start-up. No more steam need be supplied to the steam air heater than is necessary to maintain the flue gas temperature entering the dust collector above the dew point of water vapor and the condensation point of sulfuric acid mist. By insuring the operability of efficient dust collection equipment during start-up, this invention permits the firing of pulverized fuel during start-up while maintaining stack opacity and particulate emissions within acceptable limits.

While the preferred embodiment of the invention has been illustrated and described, it is to be understood that the invention should not be limited thereto.

What is claimed is:

1. An apparatus for maintaining, above a preselected level, the temperature of the flue gas entering a dust collection device on a pulverized fuel-fired steam generator having a furnace, burner for combusting a pulverized fuel in the furnace, a boiler, a main air preheater, a first gas pass for conveying flue gas from said furnace through said boiler to said main air preheater, a dust collection device, a second gas pass for conveying flue gas from said main air preheater to said dust collection device, a fan for supplying combustion air to the furnace, a first air pass for conveying the combustion air from said fan to said main air preheater and a second air pass for conveying the combustion air from said main air preheater to the furnace, therein comprising:
   a. a steam air preheater located in the first air pass between said fan and said main air preheater;
   b. means for supplying steam to said steam air heater;
   c. a steam line connecting said means for supply of steam to said steam air heater; and
   d. means for controlling the amount of steam passed in heat transfer relationship with the combustion air in accordance with the flue gas temperature entering said dust collection device, said means for controlling the amount of steam passed in heat transfer relationship with the combustion air includes:
      means disposed in the second gas pass for sensing the flue gas temperature entering the dust collection device; and
      means disposed in said steam line responsive to said temperature sensing means for actuating the flow of steam through said steam air heater when said sensed flue gas temperature drops below a preselected temperature level.

2. An apparatus as in claim 1, wherein said means for supplying steam to said steam air heater is the plant auxiliary steam supply.

3. An apparatus as in claim 1, wherein said means for supplying steam to said steam air heater is said boiler.

4. In a pulverized fuel-fired steam generator having a furnace, burners for combusting a pulverized fuel in the furnace, a boiler, a main air preheater, a dust collection device, a first gas pass for conveying flue gas from said furnace through said boiler to said main air preheater, a second gas pass for conveying flue gas from said main air preheater to said dust collection device, a fan for supplying combustion air to the furnace, a first air pass for conveying the combustion air from said fan to said main air preheater, a steam air heater disposed in said first air pass, and a second air pass for conveying the combustion air from said main air preheater to the furnace; a method of maintaining the flue gas temperature entering said dust collection device above a preselected temperature level comprising:

a. passing said combustion air thru said steam air heater in heat exchange relationship with steam;

b. thence passing said combustion air thru said main air preheater in heat exchange relationship with flue gas;

c. sensing the temperature of the flue gas entering said dust collection device;

d. comparing the sensed flue gas temperature to a preselected temperature level; and e. actuating the flow of steam in heat exchange relationship with said combustion air whenever the sensed flue gas temperature drops below the preselected temperature level.

5. A method as in claim 4, wherein the preselected temperature level for the temperature of the flue gas entering said dust collection device is higher than both the dew point of water vapor in the flue gas and the condensation point of sulfuric acid mist in the flue gas.

* * * * *